US011843867B2

(12) United States Patent
Shiota

(10) Patent No.: US 11,843,867 B2
(45) Date of Patent: Dec. 12, 2023

(54) IMAGING APPARATUS, IMAGING METHOD, AND STORAGE MEDIUM FOR CORRECTING BRIGHTNESS OF AN IMAGE BASED ON A PREDETERMINED VALUE OF EXPOSURE

(71) Applicant: CANON KABUSHIKI KAISHA, Tokyo (JP)

(72) Inventor: Ryo Shiota, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/817,310

(22) Filed: Aug. 3, 2022

(65) Prior Publication Data
US 2023/0048045 A1  Feb. 16, 2023

(30) Foreign Application Priority Data

Aug. 16, 2021 (JP) ................................. 2021-132311
May 17, 2022 (JP) ................................. 2022-080615

(51) Int. Cl.
*H04N 23/72* (2023.01)
*H04N 23/56* (2023.01)
*H04N 23/71* (2023.01)
*H04N 23/743* (2023.01)

(52) U.S. Cl.
CPC ............. *H04N 23/72* (2023.01); *H04N 23/56* (2023.01); *H04N 23/71* (2023.01); *H04N 23/743* (2023.01)

(58) Field of Classification Search
CPC ........ H04N 23/72; H04N 23/56; H04N 23/71; H04N 23/743; H04N 23/73; H04N 23/74; H04N 23/75; H04N 23/80; H04N 23/676
See application file for complete search history.

(56) References Cited

U.S. PATENT DOCUMENTS

| 2004/0160525 A1* | 8/2004 | Kingetsu | H04N 23/6812 348/E5.046 |
| 2009/0310885 A1* | 12/2009 | Tamaru | H04N 23/743 382/275 |
| 2013/0188071 A1* | 7/2013 | Fujita | H04N 23/617 348/222.1 |
| 2015/0116582 A1* | 4/2015 | Yoshikawa | H04N 23/73 348/362 |
| 2020/0213512 A1* | 7/2020 | Yasutomi | H04N 23/951 |

FOREIGN PATENT DOCUMENTS

| JP | H10290389 A | 10/1998 |
| JP | 2000 166874 A | 6/2000 |
| JP | 2020 107956 A | 7/2020 |
| JP | 2020107956 A | 7/2020 |
| JP | 6 906947 B2 | 7/2021 |

\* cited by examiner

*Primary Examiner* — Ahmed A Berhan
(74) *Attorney, Agent, or Firm* — CANON U.S.A., INC. IP Division

(57) ABSTRACT

An apparatus includes an image sensor configured to capture a plurality of images different in in-focus position, at least one memory configured to store instructions, and at least one processor in communication with the at least one memory and configured to execute the instructions to determine a predetermined value of exposure in advance, control exposure so that the image sensor captures the plurality of images with the exposure less than the predetermined value, and correct brightness of at least a part of the plurality of images based on the predetermined value.

25 Claims, 13 Drawing Sheets

IMAGING APPARATUS, IMAGING METHOD, AND STORAGE MEDIUM FOR CORRECTING BRIGHTNESS OF AN IMAGE BASED ON A PREDETERMINED VALUE OF EXPOSURE

BACKGROUND OF THE INVENTION

Field of the Invention

The present invention relates to an imaging apparatus that can perform omnifocal imaging with which the images at a plurality of in-focus positions are captured.

Description of the Related Art

There is known an imaging apparatus that performs omnifocal imaging. Omnifocal imaging refers to capturing a plurality of images different in in-focus position at all object distances focusable by an imaging apparatus (Japanese Patent Application Laid-Open Publication No. H10-290389). A technique of extracting focused areas from among the images acquired in the omnifocal imaging and combining the images at the focused areas into one image that focuses on the entire imaging area with a depth of field deeper than the depth of field of the original images is called focus stacking.

Further, it is known that omnifocal imaging entails changes in brightness among acquired images due to various factors. For example, Japanese Patent Application Laid-Open Publication No. 2020-107956 discusses that changes in brightness of images occur with variation in effective F-number in omnifocal imaging. FIG. 10 illustrates an example of a relationship between in-focus positions and variations in effective F-number in omnifocal imaging. FIG. 11 illustrates an example of a relationship between in-focus positions and variations in luminance value in omnifocal imaging. As illustrated in FIG. 10 and FIG. 11, in omnifocal imaging, the brightness is varied among the images.

In addition, it is known that the brightness is varied in omnifocal imaging using a flashlight and in omnifocal imaging using a high-speed shutter.

Combination of images with differences in brightness can result in a combined image with uneven brightness on it. To avoid the unevenness, it is suitable to correct variations in brightness of the images to be combined after the images are acquired to get desired brightness.

However, a combined image of a scene of which the brightness is corrected to be darker can have a colored high-luminance portion or lack the saturation of luminance on the image.

The above-described issues will be described with reference to a drawing. FIG. 12 is a diagram illustrating a gamma curve when an RAW image is converted into a YUV image. The luminance values of the RAW image along the horizontal axis that exceed a RAW luminance value 1201 are converted into a YUV luminance value 1202, which is the upper limit value. For example, if the maximum value of luminance of the RAW image is reduced to a RAW luminance value 1203 as a result of correction for the brightness to be darker, the upper limit value of luminance of the YUV image goes down to a YUV luminance value 1204, which makes it impossible to reach the saturation of the luminance value of the YUV image. In addition, as the brightness is reduced at a portion where the luminance value of the RAW image is close to the saturation, the ratio of the number of red pixels or blue pixels to that of green pixels of the RAW image is varied, which colors the high-luminance portion.

As described above, an omnifocal image of a scene of which the brightness is corrected to be darker can suffer some coloring or differences in the brightness even if variations in brightness are corrected to get a brightness level.

SUMMARY OF THE INVENTION

According to an aspect of the present invention, an apparatus includes an image sensor configured to capture a plurality of images different in in-focus position, at least one memory configured to store instructions, and at least one processor in communication with the at least one memory and configured to execute the instructions to determine a predetermined value of exposure in advance, control exposure so that the image sensor captures the plurality of images with the exposure less than the predetermined value, and correct brightness of at least a part of the plurality of images based on the predetermined value.

Further features of the present invention will become apparent from the following description of embodiments with reference to the attached drawings.

DESCRIPTION OF THE EMBODIMENTS

Some embodiments of the present invention will be described in detail below with reference to the accompanying drawings.

Figure 1:
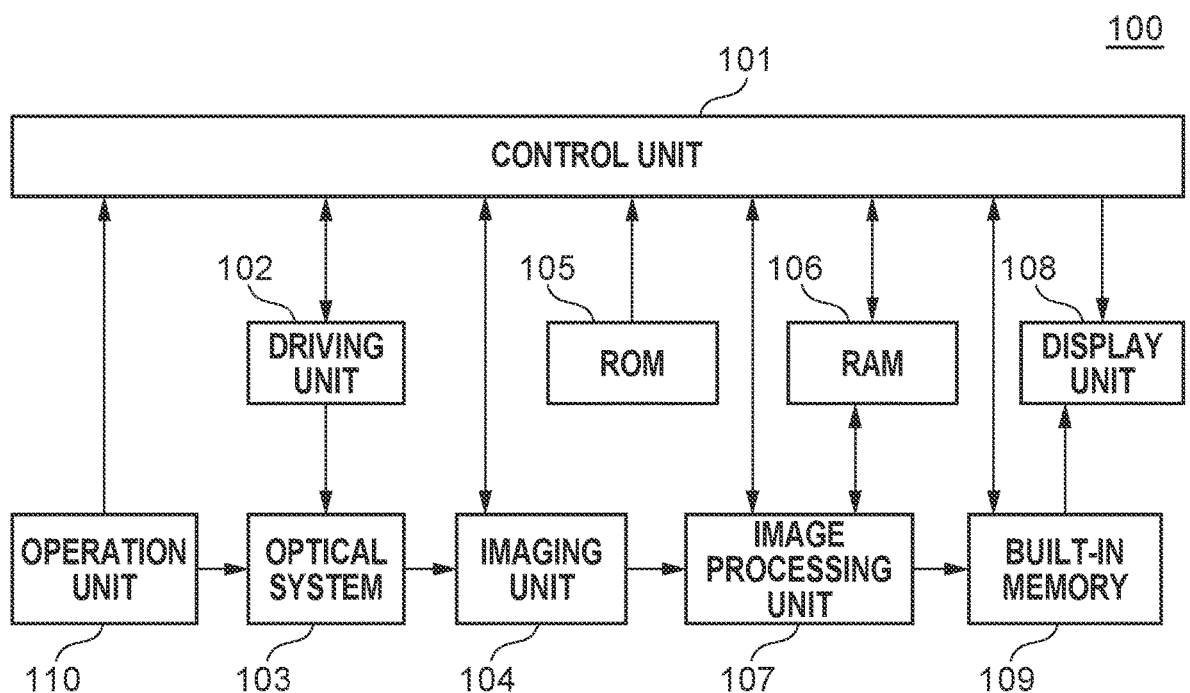
FIG. 1 is a block diagram illustrating the configuration of a digital camera according to embodiments of the present invention.

FIG. 1 is a block diagram illustrating a configuration of a digital camera as an image processing apparatus according to a first embodiment. A digital camera 100 can capture a plurality of still images while changing the focus position.

A control unit 101 is a signal processor such as a central processing unit (CPU) and a microprocessor unit (MPU). The control unit 101 controls units of the digital camera 100 while reading programs previously stored in a read only memory (ROM) 105 described below. For example, as described below, the control unit 101 issues commands to start and end imaging to an imaging unit 104 described below. Alternatively, or additionally, the control unit 101 issues an image processing command to an image processing unit 107 described below based on a program stored in the ROM 105. Commands from a user are input to the digital camera 100 through an operation unit 110 described below, and go to individual units of the digital camera 100 through the control unit 101.

A driving unit 102 includes a motor, and mechanically operates an optical system 103 described below under the control of the control unit 101. For example, the driving unit 102 moves the position of a focus lens included in the optical system 103 to adjust the focal length of the optical system 103 under the control of the control unit 101.

The optical system 103 includes a zoom lens, the focus lens, and a diaphragm. The diaphragm is a mechanism adjusting the quantity of light that passes through the diaphragm. The focus position can be changed by changing positions of lenses.

The imaging unit 104 includes a photoelectric conversion device that performs photoelectric conversion to convert an incident light signal into an electric signal. For example, a charge coupled device (CCD) sensor or a complementary metal-oxide semiconductor (CMOS) sensor is applicable to the imaging unit 104. The imaging unit 104 supports a moving image mode, and can capture a plurality of temporarily continuous images as frames of a moving image.

The ROM 105 is a read-only nonvolatile memory as a recording medium, and stores parameters for operation of the individual blocks provided in the digital camera 100, in addition to operation programs for the individual blocks. The RAM 106 is a rewritable nonvolatile memory, and is used as an area that temporarily stores data output in the operation of the individual blocks provided in the digital camera 100.

The image processing unit 107 performs various types of image processing such as white balance adjustment, color interpolation, and filtering on an image output from the imaging unit 104 or data on an image signal recorded in a built-in memory 109 described below. In addition, the image processing unit 107 performs compression processing on data on an image signal captured by the imaging unit 104 in compliance with standards such as Joint Photographic Experts Group (JPEG).

The image processing unit 107 includes an integrated circuit (application specific integrated circuits (ASIC)) integrally including circuits each performing specific processing. Alternatively, the control unit 101 may also carry out a part or all of the functions of the image processing unit 107 by performing processing based on a program read out from the ROM 105. If the control unit 101 performs all of the functions of the image processing unit 107, the image processing unit 107 as hardware is not used.

A display unit 108 is a liquid crystal display, an organic electroluminescence (EL) display, or another type of display to display an image temporarily stored in the RAM 106, an image stored in the built-in memory 109 described below, and a setting screen of the digital camera 100 by way of example.

The built-in memory 109 stores images captured by the imaging unit 104, the images processed by the image processing unit 107, information on focus position at imaging, and other types of data. In place of the built-in memory, a memory card may be used.

The operation unit 110 includes buttons, switches, keys, and a mode dial provided on the digital camera 100, and a touch panel also used as the display unit 108. Commands from the user go to the control unit 101 through the operation unit 110.

Figure 2:
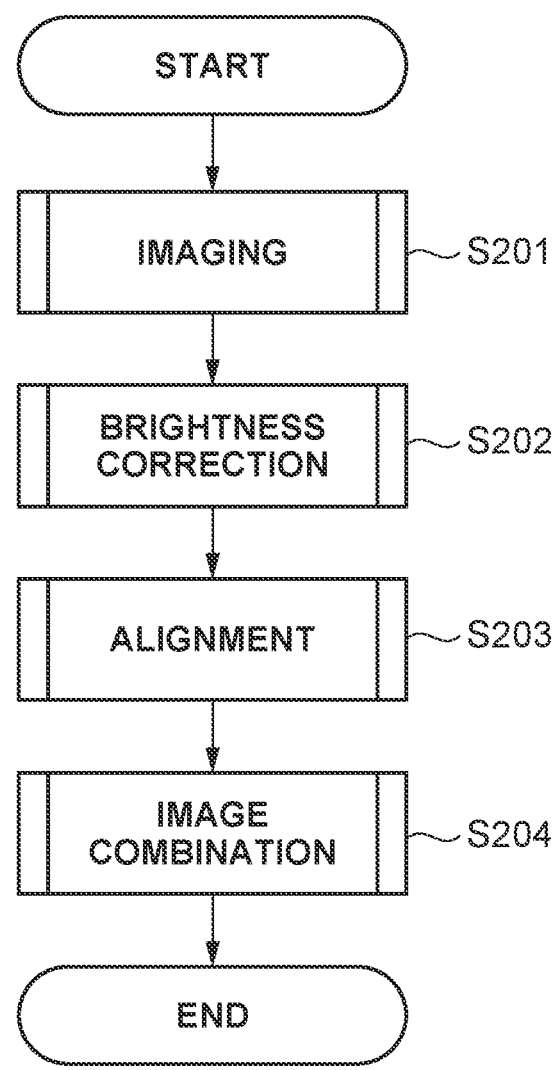
FIG. 2 is a flowchart illustrating generation of a combined image according to a first embodiment of the present invention.

FIG. 2 is a flowchart illustrating the generation of a combined image according to the present embodiment.

In step S201, the imaging unit 104 captures a plurality of images different in in-focus position.

In the present embodiment, the imaging unit 104 performs imaging by changing the in-focus position from the close distance side to the infinite distance side.

In step S202, the control unit 101 and the image processing unit 107 correct the brightness of the plurality of images captured by the imaging unit 104 in step S201.

In step S203, the control unit 101 and the image processing unit 107 align the plurality of images corrected in brightness in step S202.

In step S204, the control unit 101 and the image processing unit 107 combine the images aligned in step S203, thereby generating a combined image. In the following, each of the steps will be described in detail.

Figure 3:
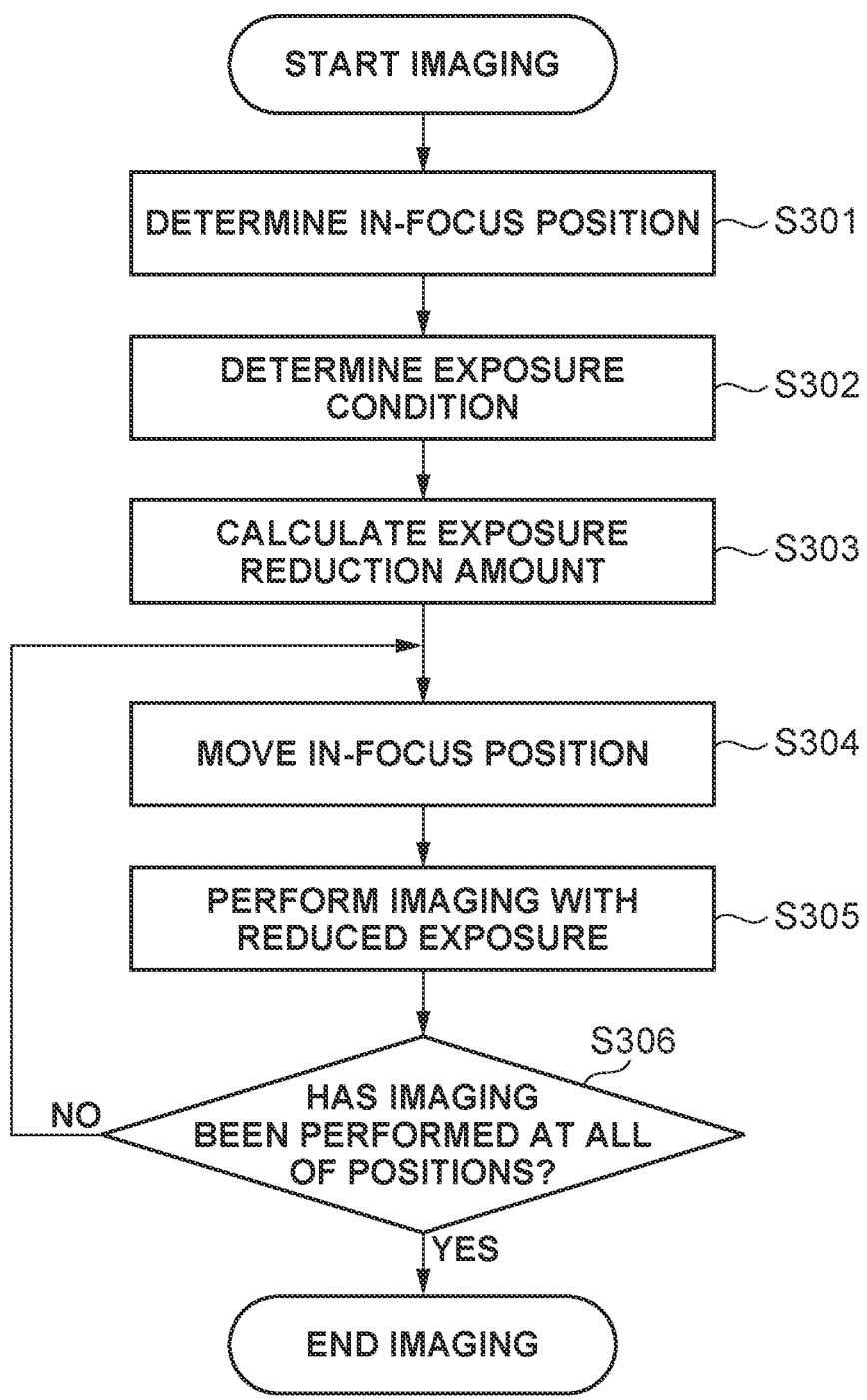
FIG. 3 is a flowchart illustrating imaging according to the first embodiment of the present invention.

FIG. 3 is a flowchart illustrating the imaging in step S201 according to the present embodiment.

In step S301, the control unit 101 sets the in-focus position. For example, the user designates a focus position through the touch panel also used as the display unit 108, and designates a plurality of in-focus positions with equal intervals in front of and behind the in-focus position corresponding to the designated focus position in the optical axis direction. At the same time, the control unit 101 determines the order of imaging at the set in-focus positions in order of distance.

In step S302, the control unit 101 determines the exposure condition of the imaging. The control unit 101 determines the shutter speed, the F-number, and the International Organization for Standardization (ISO) sensitivity. The user may manually set the exposure condition, or the control unit 101 may automatically set the exposure condition by causing the imaging unit 104 to perform photometry of the object.

In step S303, the control unit 101 calculates the quantity of exposure that corresponds to a darker condition (amount of reduction of exposure) than the exposure condition (predetermined value of exposure) determined in step S301. As an example, the amount of reduction of exposure is determined based on the performance of the lenses attached in the optical system 103. As the amount of variation in the effective F-number with the change of the in-focus position depends on the lens performance, the amount of variation in the effective F-number as the in-focus position is moved from the closest distance side to the infinite distance side may be handled as the amount of reduction of exposure by way of example. Further, when a flashlight is used, it is suitable that the amount of reduction of exposure is determined in consideration of the characteristic of the flashlight including uneven light emission. When a high-speed shutter is used, it is suitable that the amount of reduction of exposure is determined in consideration of the characteristic of the shutter including uneven exposure. Further, as the amount of reduction of exposure, the shutter speed, the F-number, or the ISO sensitivity may be used.

In step S304, the control unit 101 moves focus to an in-focus position that has not undergone imaging among the in-focus positions set in step S301, based on the order of imaging determined in step S301.

In step S305, the imaging unit 104 performs imaging with an exposure reduced by the amount of reduction of exposure determined in step S303 from the exposure determined in step S302.

In step S306, the control unit 101 determines whether the imaging has been performed at all of the in-focus positions set in step S301. If the imaging has been performed at all of the in-focus positions (YES in step S306), the processing in the flowchart ends. If any in-focus position at which the imaging is to be made is left (NO in step S306), the processing returns to step S304.

In the flowchart illustrated in FIG. 3, the control unit 101 does not change any imaging setting including the exposure other than the in-focus position while the imaging unit 104 captures a plurality of images. A mere change in in-focus position will cause the brightness of the image to be changed as described above.

Figure 4:
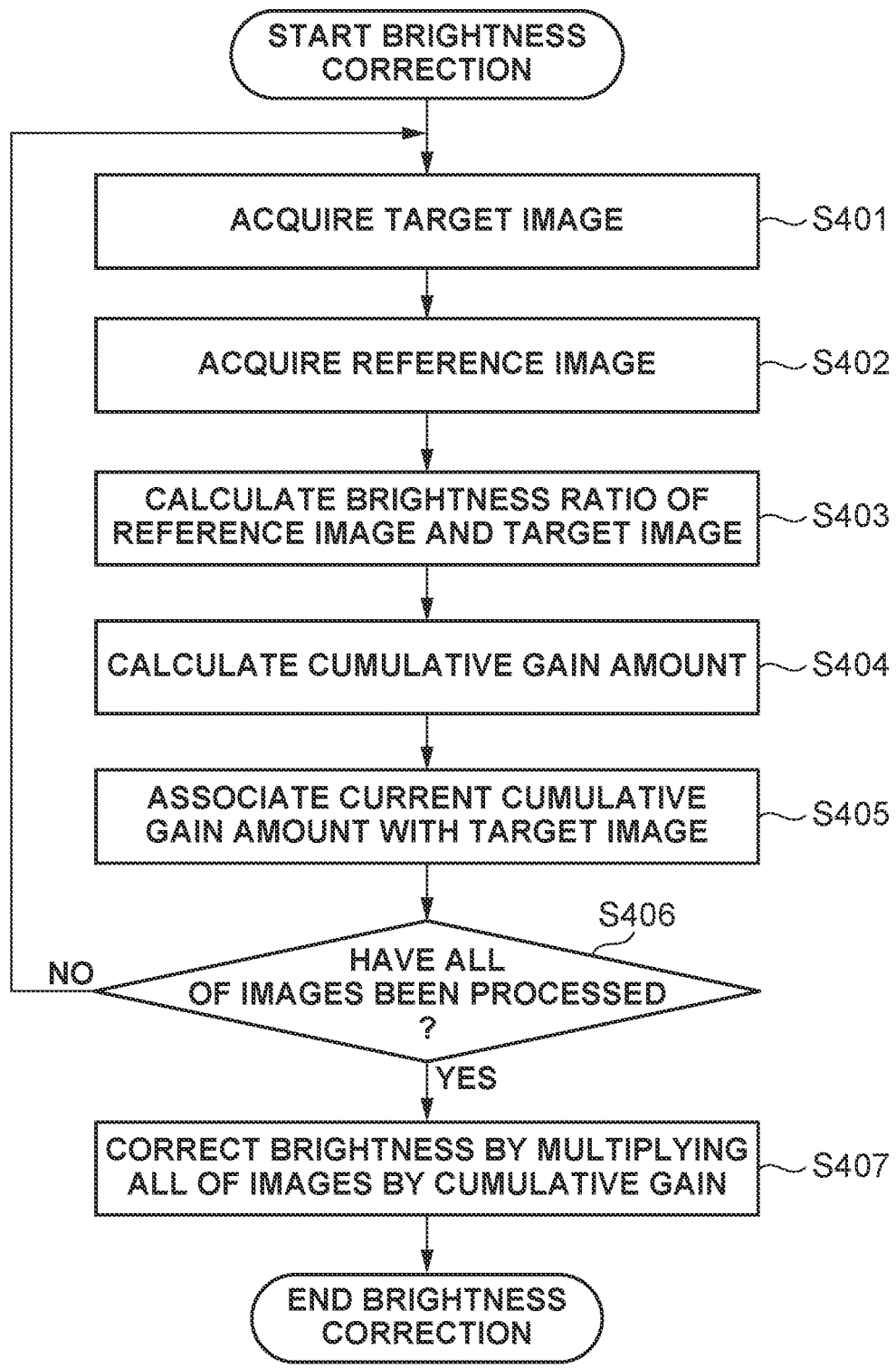
FIG. 4 is a flowchart illustrating brightness correction according to the first embodiment of the present invention.

FIG. 4 is a flowchart illustrating the brightness correction in step S202 according to the present embodiment.

In step S401, the control unit 101 acquires a brightness correction target image from among the images captured by the imaging unit 104 in step S201. The brightness correction target image is an image captured earliest in the order of imaging of the images that are not yet targeted for the brightness correction, other than the image captured first.

In step S402, the control unit 101 acquires a brightness correction reference image from among the images captured by the imaging unit 104 in step S201. The brightness correction reference image is an image captured before the target image is captured.

In step S403, the control unit 101 calculates a brightness ratio of the reference image to the target image. As a calculation method, for example, the brightness ratio is determined through comparison of the integral value of green pixels of the RAW image of the reference image with the integral value of green pixels of the RAW image of the target image; however, the comparison may be performed using the YUV images or the RGB images, or based on the amount of photometric at the imaging.

In step S404, the control unit 101 calculates the amount of cumulative gain obtained by cumulating the brightness ratios determined in step S403. The amount of cumulative gain is determined by multiplying the amount of gain determined before the current reference image and the current target image by the ratio determined in current step S403, in order to bring the brightness of the target image close to the exposure determined in step S302.

In step S405, the control unit 101 associates the amount of cumulative gain determined in step S404 with the target image. It is suitable that the combination of the amount of cumulative gain and the target image is stored in an array form in the RAM 106.

In step S406, the control unit 101 determines whether all of the images have been processed. If all of the images have been processed (YES in step S406), the processing proceeds to step S407. Otherwise (NO in step S406), the processing returns to step S401.

In step S407, the image processing unit 107 performs the brightness correction by the amount of cumulative gain associated in step S405 uniform over an image plane, on all of the images other than the image captured first. Brightness correction may be performed on RAW images after sensor output, may be performed when the RAW image is converted into the YUV image, or may be performed on RGB images.

Figure 5:
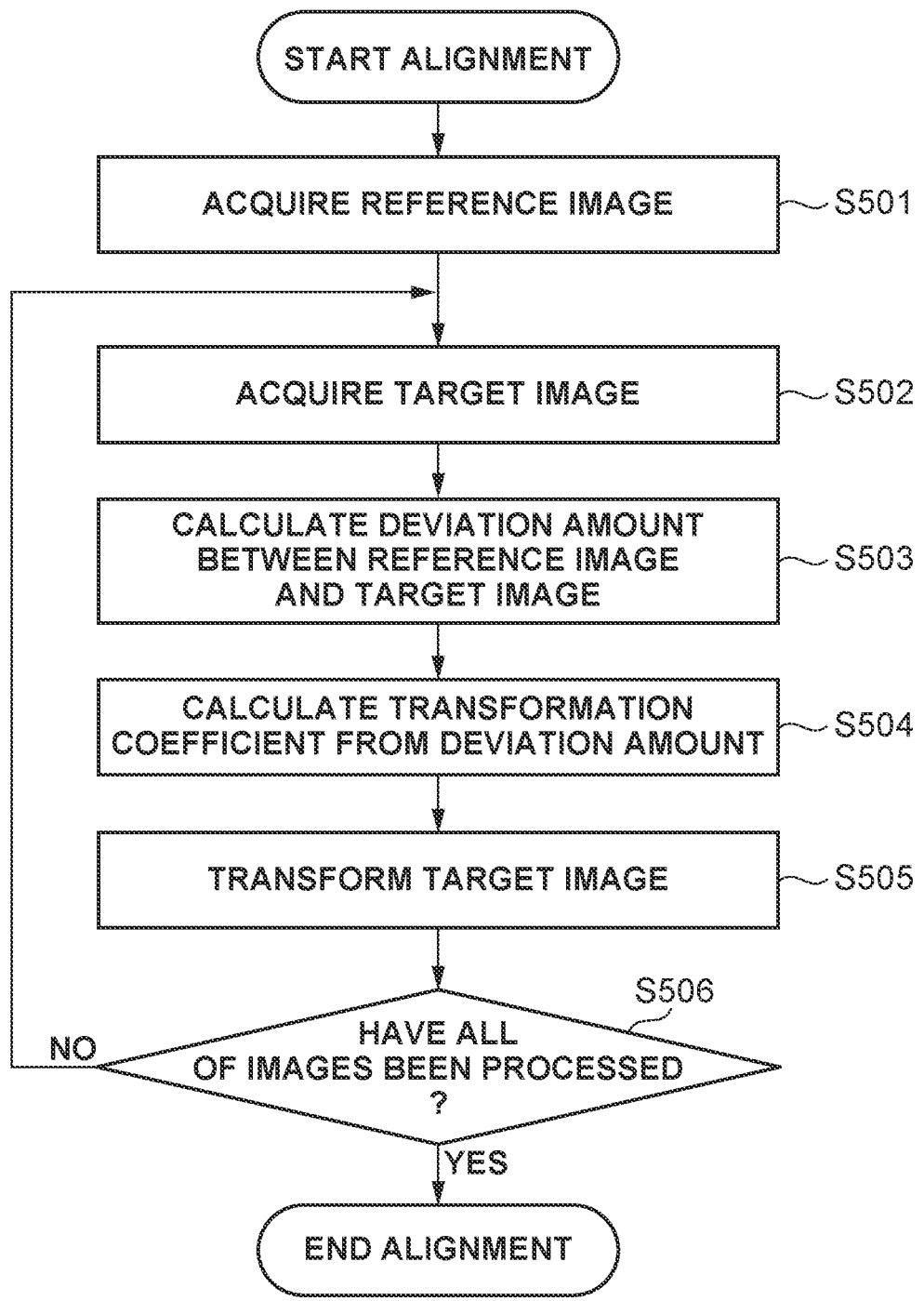
FIG. 5 is a flowchart illustrating alignment according to the first embodiment of the present invention.

FIG. 5 is a flowchart illustrating the alignment in step S203 according to the present embodiment.

In step S501, the control unit 101 acquires an alignment reference image from among the images captured by the imaging unit 104 in step S201. The alignment reference image is an image captured earliest in the order of imaging. Alternatively, the alignment reference image may be an image with the narrowest angle of field of the captured images because the angle of field is slightly varied among the images captured while the in-focus position is changed.

In step S502, the control unit 101 acquires an alignment processing target image. The target image is an image yet to be subjected to the alignment processing of the images other than the reference image acquired in step S501. If the image earliest in the order of imaging is used as the reference image, the control unit 101 sequentially acquires the target image in the order of imaging.

In step S503, the control unit 101 calculates the amount of positional deviation between the reference image and the target image. An example of a calculation method is as follows. The control unit 101 first sets a plurality of blocks in the reference image. It is suitable that the set blocks have a common size. Next, the control unit 101 sets search ranges on the target image at the positions the same as those of the blocks on the reference image, the search ranges of which each are wider than the corresponding block of the blocks of the reference image. Finally, the control unit 101 calculates a corresponding point at which the sum of absolute difference (SAD) of luminance from that of the corresponding block of the reference image is minimum, for each of the search ranges of the target image. The control unit 101 calculates positional deviation in step S503 in a vector based on the center of each of the blocks of the reference image and the above-described corresponding point. To calculate the above-described correction point, the control unit 101 may use the sum of squared difference (SSD) or a normalized cross correlation (NCC), besides the SAD.

In step S504, the control unit 101 calculates a transformation coefficient based on the amount of positional deviation between the reference image and the target image. The control unit 101 uses a projective transformation coefficient as the transformation coefficient by way of example. However, the transformation coefficient is not limited to the projective transformation coefficient. An affine transformation coefficient or a simplified transformation coefficient including horizontal/vertical shift alone may be used.

In step S505, the image processing unit 107 performs transformation on the target image using the transformation coefficient calculated in step S504.

For example, the control unit 101 can perform the transformation using an expression (1).

[Exp. 1]

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix} \quad (1)$$

In the expression (1), (x', y') represents coordinates after the transformation, and (x, y) represents coordinates before the transformation. A matrix A represents the transformation coefficient calculated by the control unit 101 in step S404.

In step S506, the control unit 101 determines whether the alignment has been performed on all of the images other than the reference image. If the alignment has been performed on all of the images other than the reference image (YES in step S506), the processing of the flowchart illustrated in FIG. 5 ends. If any image to be subjected to the alignment is left (NO in step S506), the processing returns to step S502.

If a plurality of images captured by a multi-lens camera are aligned, the amount of parallax generated by positional difference of the optical system 103 can be determined through the calculation of the amount of positional deviation in step S503. Thus, the alignment can be made by similar processing.

Figure 6:
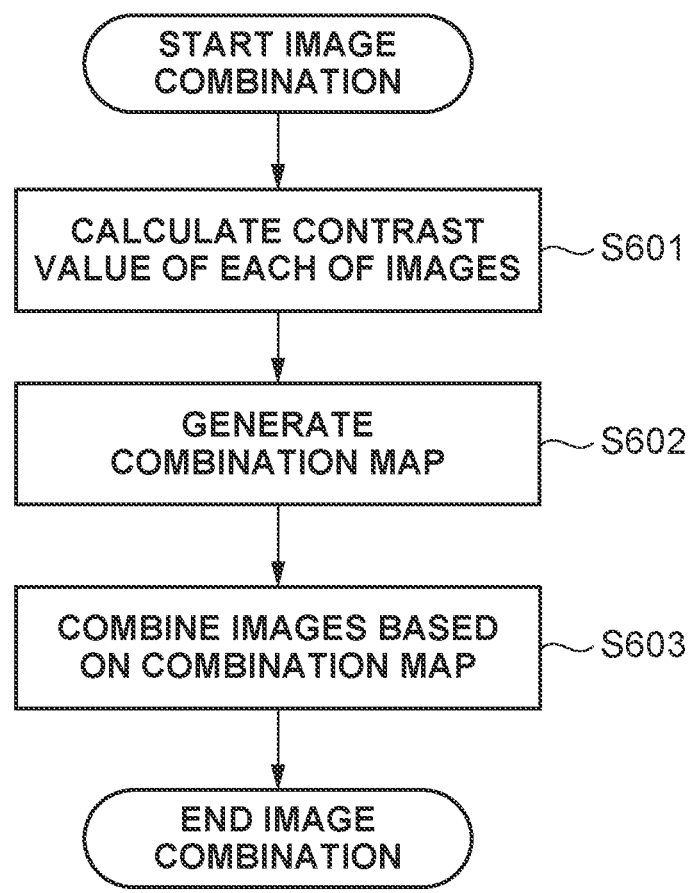
FIG. 6 is a flowchart illustrating image combination according to the first embodiment of the present invention.

FIG. 6 is a flowchart illustrating the image combination in step S204 according to the present embodiment.

In step S601, the image processing unit 107 calculates the contrast value of each of the images subjected to the alignment (including reference image). As an example of a method of calculating the contrast value, the image processing unit 107 first calculates a luminance Y by using the following expression (2) from color signals Sr, Sg, and Sb of each pixel.

$$Y = 0.299Sr + 0.587Sg + 0.114Sb \quad (2)$$

Next, a contrast value I is calculated by applying a Sobel filter to a 3×3 pixel matrix L of the luminance Y as represented by the following expressions (3) to (5).

[Exp. 3]

$$I_h = \begin{pmatrix} -1 & 0 & 1 \\ -2 & 0 & 2 \\ -1 & 0 & 1 \end{pmatrix} \cdot L \quad (3)$$

[Exp. 4]

$$I_v = \begin{pmatrix} -1 & -2 & -1 \\ 0 & 0 & 0 \\ 1 & 2 & 1 \end{pmatrix} \cdot L \quad (4)$$

[Exp. 5]

$$I = \sqrt{I_h^2 + I_v^2} \quad (5)$$

The above-described method of calculating the contrast value is illustrative, and for example, an edge detection filter such as a Laplacian filter, or a band pass filter that allows a predetermined frequency band to pass through may also be used.

In step S602, the image processing unit 107 generates a combination map. As a method of generating a combination map, the image processing unit 107 compares the contrast values of the pixels at the same position among the images, and calculates the combination ratio corresponding to the contrast values.

A specific example of the calculation method will be described.

A combination map Am(x, y) is generated by using a contrast value Cm(x, y) calculated in step S601, where m represents an m-th image among a plurality of images different in in-focus position, x represents the horizontal coordinate of the image, and y represents the vertical coordinate of the image. As a method of generating the combination map, the image processing unit 107 compares the contrast values of the pixels at the same position among the images, and calculates the combination ratio corresponding to the contrast values. More specifically, a combination ratio of 100% is provided to a pixel with the highest contrast value of the pixels at the same position, and a combination ratio of 0% is provided to the other pixels at the same position. In other words, the following expression (6) is established.

[Exp. 6]

$$A_m(x, y) = \max_{k=1} C_k(x, y) \quad (6)$$

In step S602, in addition, to get smooth boundary, combination ratios are adjusted as appropriately. As a result, the combination ratio of the combination map in one image does not vary between two values of 0% and 100%, but continuously varies.

In step S603, the image processing unit 107 generates an omnifocal image O(x, y) by combining the captured images based on the combination maps calculated in step S602. Let Im(x, y) denote each of the captured original images, and the omnifocal image is generated based on the following expression (7).

[Exp. 7]

$$O(x, y) = \sum_{k=1}^{M} B_k(x, y) \times I_k(x, y) \quad (7)$$

In the present embodiment, to correct variations in luminance value with changes in the in-focus position, smoothing out luminance level differences generated by diaphragm driving is considered.

Figure 7:
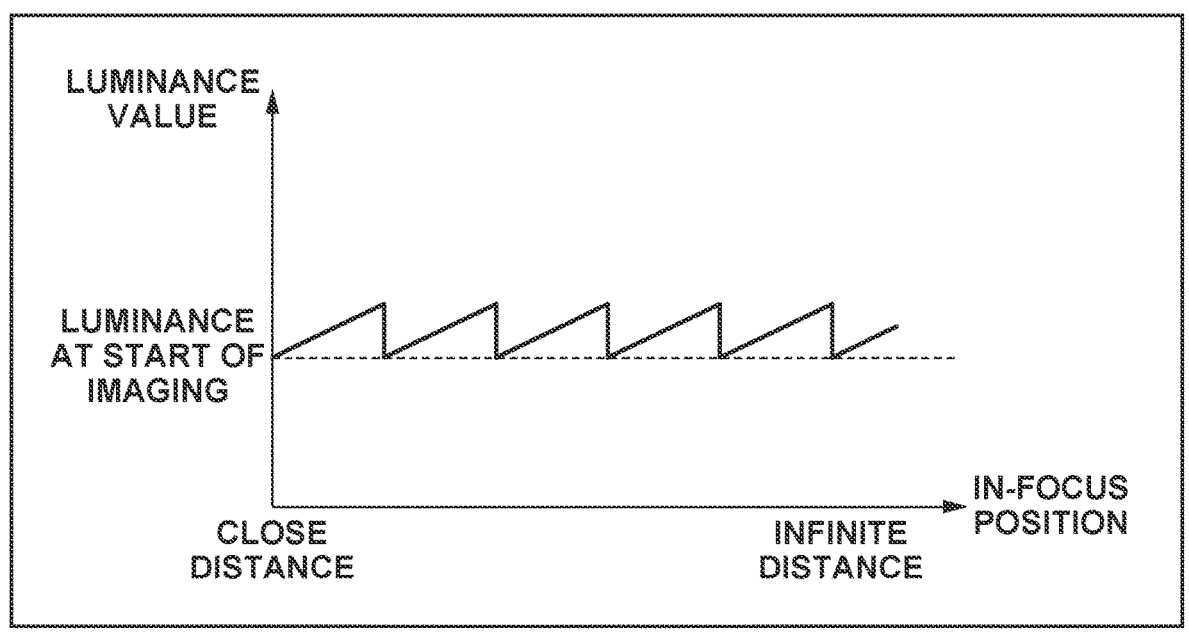
FIG. 7 is a diagram illustrating luminance variations when a diaphragm is driven under a condition where a luminance value is varied with change of an in-focus position.

FIG. 7 is a diagram illustrating luminance variations when the diaphragm is driven under a condition where the luminance value is varied with the change of the in-focus position. To cope with the increases of the luminance with the movements of the in-focus position, a system is considered that narrows the aperture of the lens in response to a detection of a specific luminance shift to keep the luminance at a level at the start of imaging as illustrated in FIG. 7. However, the system illustrated in FIG. 7 that corrects the luminance of the captured images to keep the luminance at a level at the start of imaging causes the image darker, which will color high-luminance portions of the image or prevent the luminance from reaching the saturation point.

Figure 8:
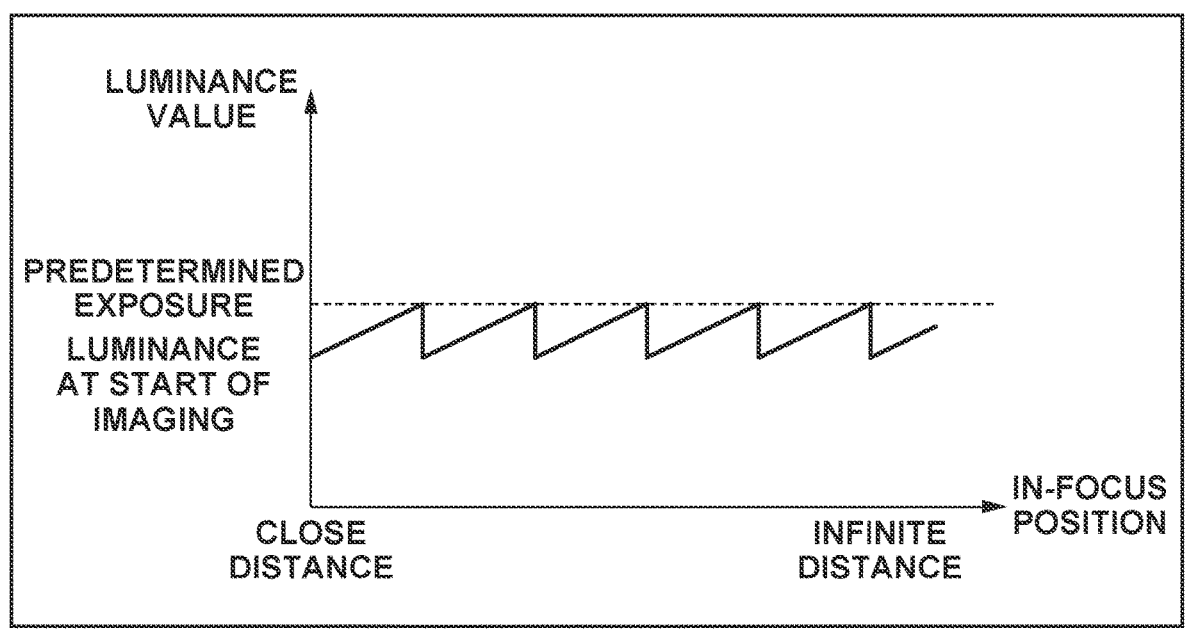
FIG. 8 is a diagram illustrating luminance variations when a diaphragm is driven according to the first embodiment of the present invention.

FIG. 8 is a diagram illustrating luminance variation when the diaphragm is driven in the first embodiment. In the first embodiment, in the calculation of the amount of reduction of exposure in step S303 of FIG. 3, designating the magnitude of an exposure level difference when the diaphragm is driven in FIG. 8 makes it possible to perform imaging not to exceed the predetermined exposure as illustrated in FIG. 8. Imaging performed as illustrated in FIG. 8 will enable the luminance to be corrected to be brighter in the image processing in step S407 of FIG. 4, generating a combined image with a reduced coloring and exposure level difference.

A second embodiment of the present invention will be described with reference to drawings. In the second embodiment, unlike the first embodiment, the exposure determination method in capturing images is changed based on whether to combine the images. The details will be described.

Figure 9:
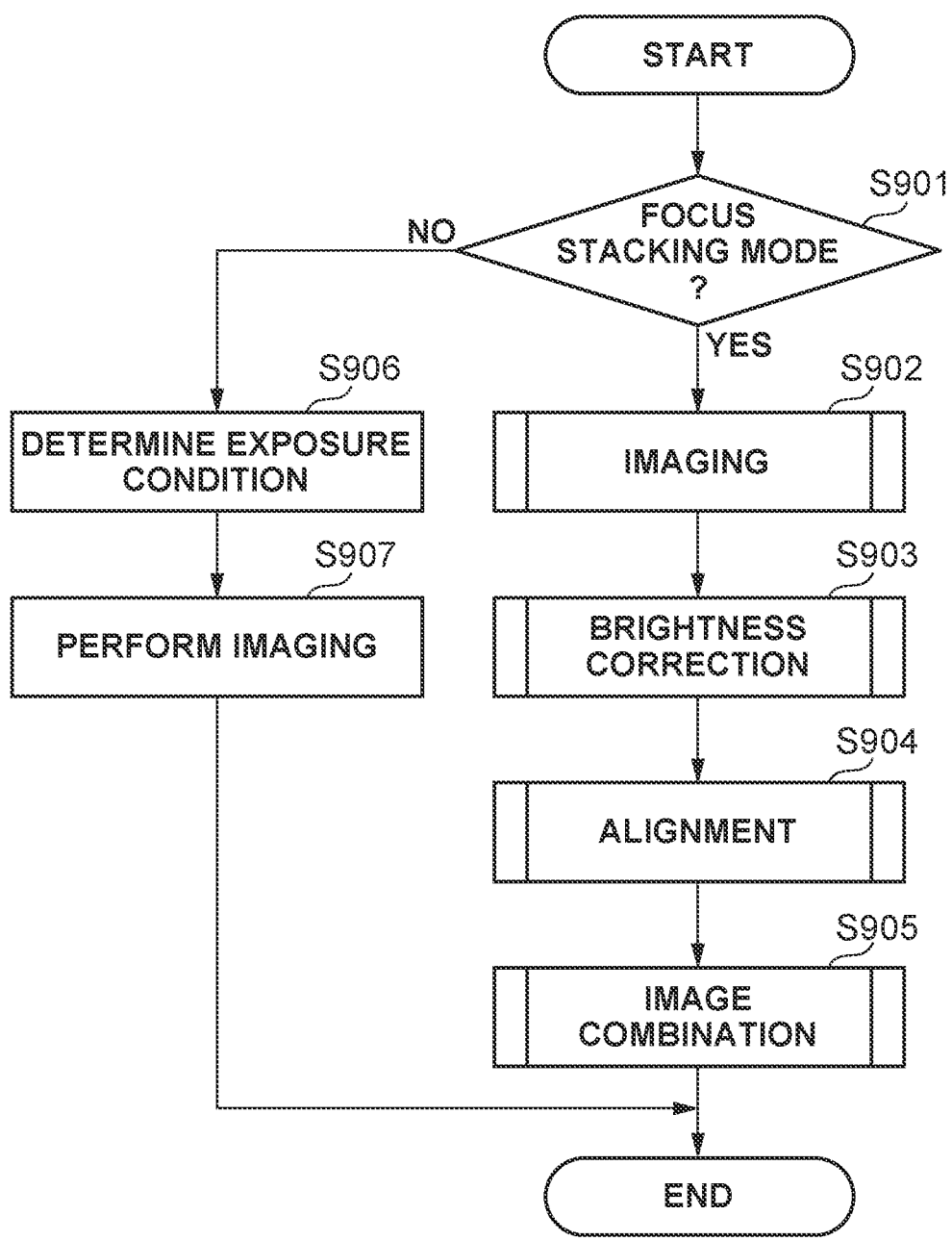
FIG. 9 is a flowchart illustrating combination of images according to a second embodiment of the present invention.
Figure 10:
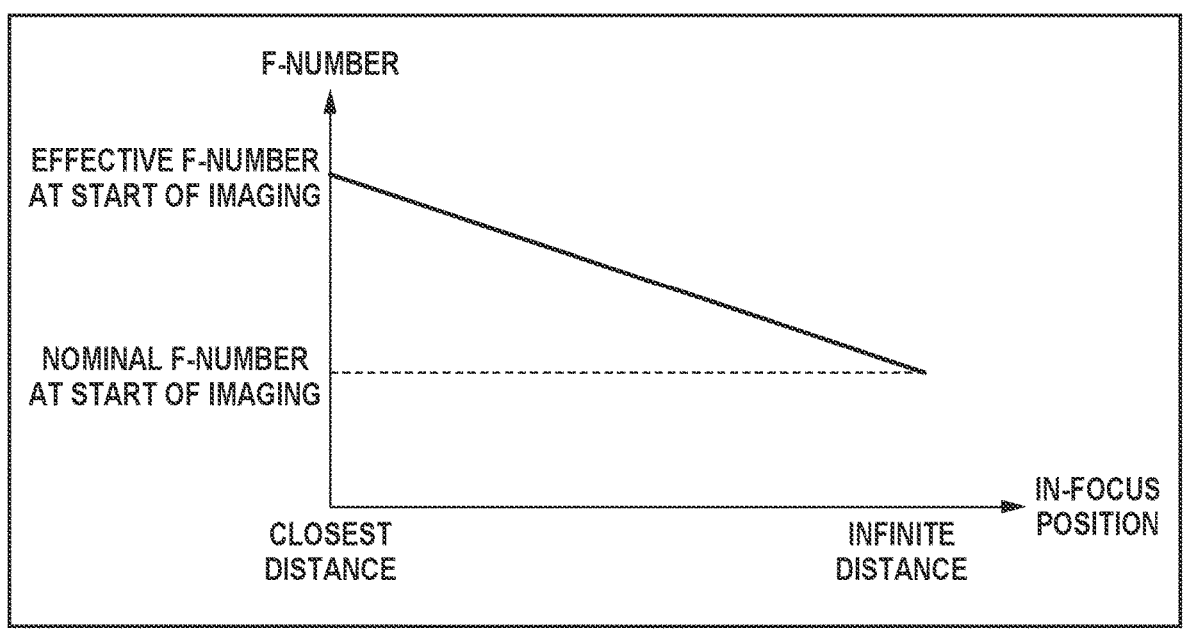
FIG. 10 illustrates an example of a relationship between in-focus positions and variations in effective F-number in omnifocal imaging.
Figure 11:
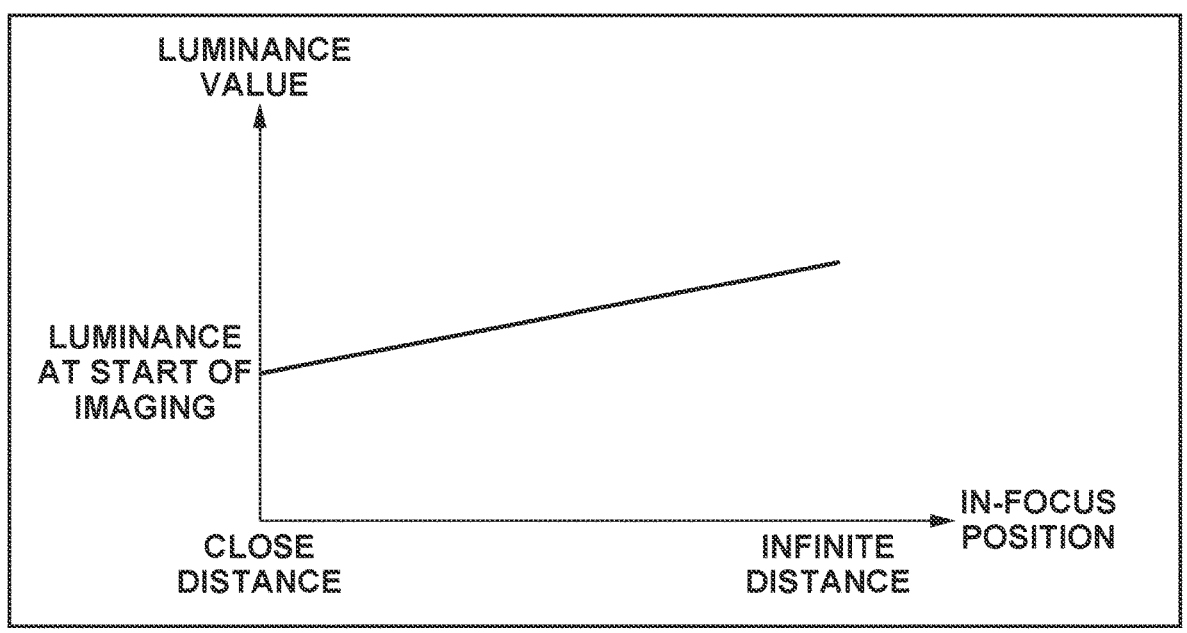
FIG. 11 illustrates an example of a relationship between in-focus positions and variations in luminance value in omnifocal imaging.
Figure 12:
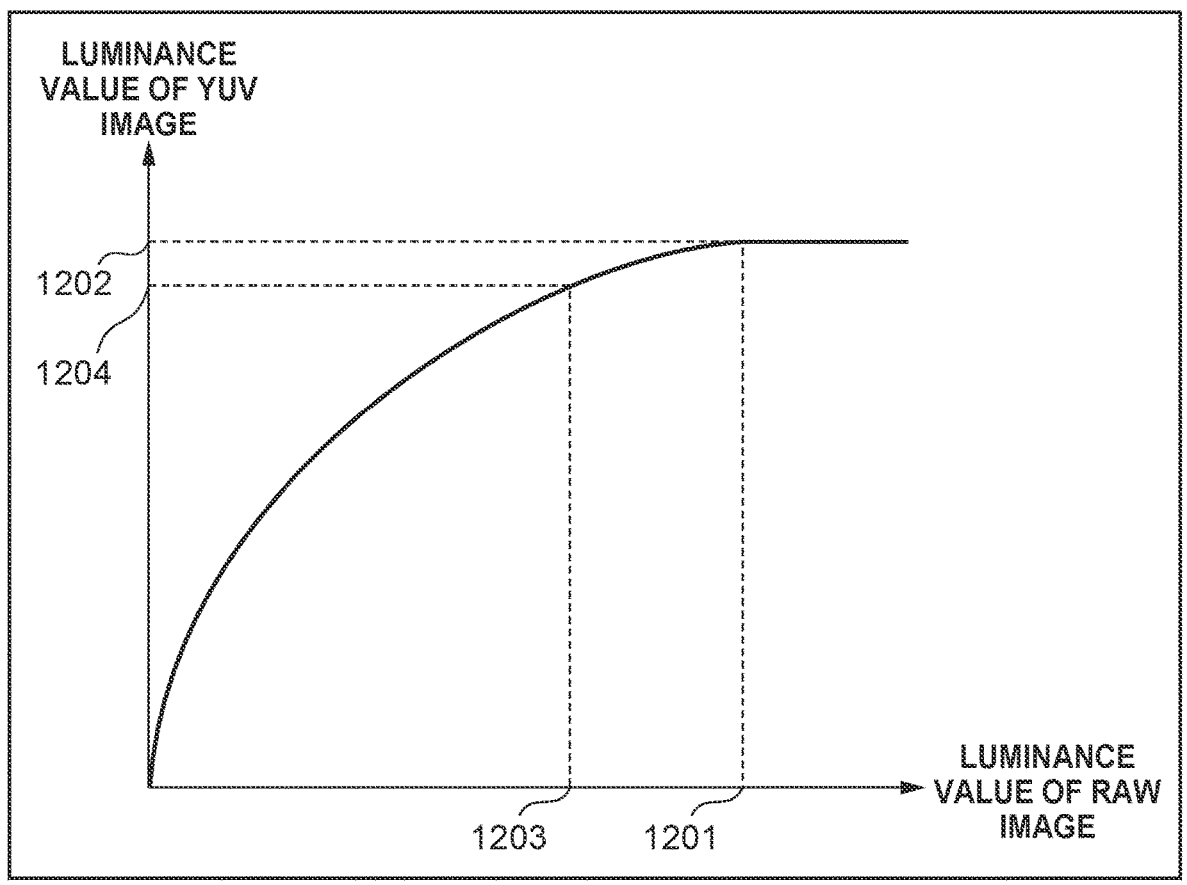
FIG. 12 is a diagram illustrating a gamma curve when a RAW image is converted into a YUV image.

FIG. 9 is a flowchart illustrating generation of a combined image according to the present embodiment. In the second embodiment, the digital camera 100 supports a plurality of imaging modes, and one of the imaging modes is a focus stacking mode.

In step S901, the control unit 101 determines whether the imaging mode of the digital camera 100 is set to the focus stacking mode. If the imaging mode is the focus stacking mode (YES in step S901), the processing proceeds to step S902, and subsequent processing is the same as the processing described in the first embodiment. If the imaging mode is not the focus stacking mode (NO in step S901), the processing proceeds to step S906.

In step S906, the control unit 101 determines the imaging exposure condition. As in step S302 according to the first embodiment, the control unit 101 determines the shutter speed, the F-number, and the ISO sensitivity. The user may manually set the exposure condition, or the control unit 101 may automatically set the exposure condition by causing the imaging unit 104 to perform photometry of an object.

In step S907, the imaging unit 104 performs imaging under the exposure condition determined in step S906. In step S907, even if the imaging unit 104 captures a plurality of images, the exposure condition used in capturing of the images and determined in step S906 is maintained.

According to the present embodiment, in focus stacking, images are captured at an exposure darker than a predetermined exposure, and the image processing corrects images to be brighter, which makes it possible to generate a combined image with a reduced coloring and exposure level difference. In other cases, imaging can be performed without changing the exposure.

Other Embodiments

Figure 13:
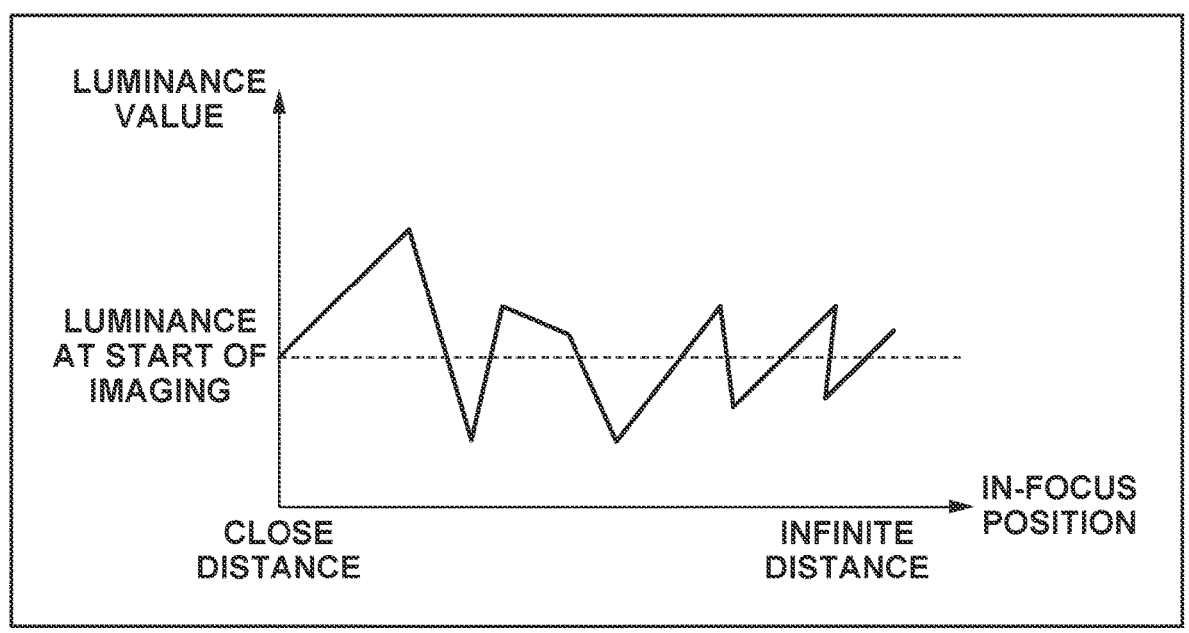
FIG. 13 is a diagram illustrating variations in luminance due to uneven emission or uneven exposure when a plurality of images is captured according to the embodiment of the present invention.

The above-described embodiments have been described on the premise of the focus stacking; however, this is not limitative. Even if a plurality of images is captured with the in-focus position unchanged, the exposure may vary due to uneven emission in using a flashlight or uneven exposure in using a high-speed shutter. FIG. 13 is a diagram illustrating variations in luminance due to uneven emission or uneven exposure while a plurality of images is being captured. If the images illustrated in FIG. 13 is combined in some way, uneven brightness appears on a combined image as in the first embodiment. To counteract such uneven brightness, a method of performing imaging with the exposure less than the predetermined value as described in the first embodiment is effective.

The above-described embodiments have been described on the premise of implementation in the digital camera; however, the configuration is not limited to the digital camera. For example, a mobile device including an imaging device, or a network camera that can capture images may be used.

The embodiments of the present invention can be implemented by feeding a program for carrying out one or more of the functions of the above-described embodiments to a system or an apparatus through a network or a storage medium, and by causing one or more processors in a computer of the system or the apparatus to read out and run the program. Further, the embodiments of the present invention can be implemented by a circuit (e.g., ASIC) for carrying out one or more of the functions.

The configurations of the embodiments allow the generation of an excellent combined image with a reduced coloring and brightness level difference.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Applications No. 2021-132311, filed Aug. 16, 2021, and No. 2022-080615, filed May 17, 2022, which are hereby incorporated by reference herein in their entirety.

What is claimed is:

1. An apparatus, comprising:
an image sensor configured to capture a plurality of images different in in-focus position;
at least one memory configured to store instructions; and
at least one processor in communication with the at least one memory and configured to execute the instructions to:
determine a predetermined value of exposure in advance;
control exposure so that the image sensor captures the plurality of images with the exposure less than the predetermined value; and
correct brightness of at least a part of the plurality of images based on the predetermined value,
wherein the corrected brightness is performed by an amount of cumulative gain obtained by cumulating brightness ratios.

2. The apparatus according to claim 1, wherein the at least one processor is further configured to execute instructions to correct brightness of at least a part of the plurality of images to adjust exposure of the said at least a part of the plurality of images equal to the predetermined value.

3. The apparatus according to claim 1, wherein the image sensor is configured to capture the plurality of images while changing the in-focus position.

4. The apparatus according to claim 3, wherein the image sensor is configured to capture the plurality of images while the in-focus position is changed from a close distance side to an infinite distance side.

5. The apparatus according to claim 1, wherein the at least one processor is further configured to execute instructions to determine the predetermined value based on a photometric amount when a first image of the plurality of images is captured.

6. The apparatus according to claim 1, wherein the at least one processor is further configured to execute instructions to determine the predetermined value based on setting by a user.

7. The apparatus according to claim 1, wherein the at least one processor is further configured to execute instructions to control the exposure when the image sensor captures the plurality of images, by controlling at least one of a shutter speed, a F-number, or ISO sensitivity.

8. The apparatus according to claim 1,
wherein an effective F-number when the image sensor is configured to capture the plurality of images is varied, and
wherein the at least one processor is further configured to execute instructions to control the exposure when the image sensor captures the plurality of images, based on a variation amount of the effective F-number.

9. The apparatus according to claim 1,
wherein a flashlight is used when the image sensor is configured to capture the plurality of images, and
wherein the at least one processor is further configured to execute instructions to control the exposure when the image sensor captures the plurality of images, based on characteristics of the flashlight.

10. The apparatus according to claim 9, wherein the characteristics of the flashlight includes emission unevenness of the flashlight.

11. The apparatus according to claim 1,
wherein the image sensor is configured to capture the plurality of images using a shutter, and
wherein the at least one processor is further configured to execute instructions to control the exposure when the image sensor captures the plurality of images, based on characteristics of the shutter.

12. The apparatus according to claim 11, wherein the characteristics of the shutter includes exposure unevenness caused by the shutter.

13. The apparatus according to claim 1, wherein the at least one processor is further configured to execute instructions to perform the correction on RAW images, YUV images, or RGB images of the respective images.

14. The apparatus according to claim 1, wherein the at least one processor is further configured to execute instructions to perform the correction based on an integral value of green pixels of a RAW image of each of the plurality of images.

15. The apparatus according to claim 1, wherein the at least one processor is further configured to execute instructions to perform the correction based on a photometric amount when the image sensor captures the plurality of images.

16. The apparatus according to claim 1, wherein the at least one processor is further configured to execute instructions to combine the plurality of images to generate a combined image, the combined image having a depth of field deeper than a depth of field of any of the plurality of images.

17. The apparatus according to claim 16, wherein the at least one processor is further configured to execute instructions to generate the combined image by extracting a focused area of each of the plurality of images.

18. An image processing method, comprising:
determining a predetermined value of exposure in advance;
capturing the plurality of images different in in-focus position;
controlling exposure so that the plurality of images is captured with the exposure less than the predetermined value; and
correcting brightness of at least a part of the plurality of images based on the predetermined value,
wherein the corrected brightness is performed by an amount of cumulative gain obtained by cumulating brightness ratios.

19. A non-transitory computer-readable storage medium that stores a program for causing a computer of an image pickup apparatus to execute a method comprising:
determining a predetermined value of exposure in advance;
capturing a plurality of images different in in-focus position;
controlling exposure so that the plurality of images is captured with the exposure less than the predetermined value; and
correcting brightness of at least a part of the plurality of images based on the predetermined value,
wherein the corrected brightness is performed by an amount of cumulative gain obtained by cumulating brightness ratios.

20. An apparatus, comprising:
an image sensor configured to capture a plurality of images;
at least one memory configured to store instructions; and
at least one processor in communication with the at least one memory and configured to execute the instructions to:
determine a predetermined value of exposure in advance;
control exposure when the image sensor captures the plurality of images;
correct brightness of at least a part of the plurality of images based on the predetermined value; and
combine at least a part of the plurality of images,
wherein, in a first mode in which the combination is performed, the control is performed so that the image sensor captures the plurality of images with the exposure less than the predetermined value, and the correction is performed,
wherein, in a second mode in which the combination is not performed, the control is performed so that the image sensor captures the plurality of images with the predetermined value, and
wherein the corrected brightness is performed by an amount of cumulative gain obtained by cumulating brightness ratios.

21. The apparatus according to claim 20, wherein the at least one processor is further configured to execute instructions not to perform the correction in the second mode.

22. The apparatus according to claim 20, wherein the plurality of images is different in in-focus position.

23. The apparatus according to claim 20, wherein the at least one processor is further configured to execute instructions to generate a combined image having a depth of field deeper than a depth of field of at least a part of the plurality of images.

24. An imaging method, comprising:
determining a predetermined value of exposure in advance;
capturing a plurality of images;
controlling exposure when the plurality of different images is captured;

correcting brightness of at least a part of the plurality of images based on the predetermined value; and combining at least a part of the plurality of images, wherein, in a first mode in which the combination is performed, the control is performed so that the plurality of images is captured with the exposure less than the predetermined value, and the correction is performed, wherein, in a second mode in which the combination is not performed, the control is performed so that the plurality of images is captured with the predetermined value, and wherein the corrected brightness is performed by an amount of cumulative gain obtained by cumulating brightness ratios.

25. A non-transitory computer-readable storage medium that stores a program for causing a computer of an image pickup apparatus to execute a method comprising:

determining a predetermined value of exposure in advance;

capturing a plurality of images;

controlling exposure when the plurality of images is captured;

correcting brightness of at least a part of the plurality of images based on the predetermined value; and combining at least a part of the plurality of images, wherein, in a first mode in which the combination is performed, the control is performed so that the plurality of images is captured with the exposure less than the predetermined value, and the correction is performed, wherein, in a second mode in which the combination is not performed, the control is performed so that the plurality of images is captured with the predetermined value, and wherein the corrected brightness is performed by an amount of cumulative gain obtained by cumulating brightness ratios.

* * * * *